(12) United States Patent
Taylor et al.

(10) Patent No.: US 6,169,332 B1
(45) Date of Patent: Jan. 2, 2001

(54) CONSTANT TURBINE INLET TEMPERATURE CONTROL OF A TURBINE POWER GENERATING SYSTEM

(75) Inventors: Colin Taylor, Lakewood, CA (US); Patrick L. O'Brien, Albuquerque, NM (US)

(73) Assignee: AlliedSignal, Inc., Morristown, NJ (US)

(*) Notice: Under 35 U.S.C. 154(b), the term of this patent shall be extended for 0 days.

(21) Appl. No.: 09/391,277

(22) Filed: Sep. 7, 1999

Related U.S. Application Data

(63) Continuation-in-part of application No. 08/995,464, filed on Dec. 20, 1997, now abandoned.

(51) Int. Cl.$^7$ .................................................. F02D 29/06
(52) U.S. Cl. .......................... 290/7; 290/31; 290/32; 290/362; 290/38 R; 290/40 R; 290/40 A
(58) Field of Search .................... 290/31, 32, 52, 290/36 R, 40 R, 46; 60/39.51, 262, 266

(56) References Cited

U.S. PATENT DOCUMENTS

| | | |
|---|---|---|
| 3,771,311 | 11/1973 | Herbst . |
| 3,970,163 | 7/1976 | Kinoshita . |
| 4,051,679 | 10/1977 | Collin . |
| 4,157,011 | 6/1979 | Liddle . |
| 4,183,420 | 1/1980 | Kinoshita . |
| 4,290,268 | 9/1981 | Lowther . |
| 4,340,820 * | 7/1982 | Meyer-Pitroff et al. ........... 290/40 R |
| 4,414,805 | 11/1983 | Walker . |
| 4,470,261 | 9/1984 | Kronogard . |
| 4,587,436 * | 5/1986 | Cronin .................................. 310/21 |
| 4,598,542 | 7/1986 | Reynolds . |
| 4,674,276 | 6/1987 | Kitaguchi . |
| 4,691,274 * | 9/1987 | Matouk et al. ....................... 363/141 |
| 4,754,607 * | 7/1988 | Mackay ................................. 60/723 |
| 4,908,565 * | 3/1990 | Cook et al. .......................... 322/10 |
| 5,373,195 * | 12/1994 | De Doncker et al. ................. 307/45 |
| 5,493,201 * | 2/1996 | Baker ................................... 322/10 |
| 5,587,647 * | 12/1996 | Bansal et al. ......................... 322/45 |

FOREIGN PATENT DOCUMENTS 0472294 2/1992 (EP) .

* cited by examiner

*Primary Examiner*—Elvin Enad
(74) *Attorney, Agent, or Firm*—Ephraim Starr; John R. Rafter

(57) ABSTRACT

A microturbine power generating system includes an electrical generator and a turbine having a fixed inlet nozzle geometry. Maximum thermodynamic efficiency of the microturbine power generating system is achieved by maintaining the turbine inlet at or near maximum temperature. When power demanded of the system is constant, power is supplied by the electrical generator. When an increase in power is demanded, at least a portion of the entire demand is supplied by a battery or other energy storage device until the electrical generator can satisfy the increased power demand. Conversely, when a decrease in power is demanded, the load on the generator is temporarily increased (effectively putting a brake on the generator and turbine) and such load is absorbed by the battery or other energy storage device.

20 Claims, 2 Drawing Sheets

CONSTANT TURBINE INLET TEMPERATURE CONTROL OF A TURBINE POWER GENERATING SYSTEM

CROSS REFERENCE TO RELATED INVENTIONS

This application is a continuation-in-part, and claims the benefit of the filing date, of non-provisional application Ser. No. 08/995,464, filed on Dec. 20, 1997 now abandoned. The present application is commonly assigned with the earlier application and has common inventorship with the earlier application.

BACKGROUND OF THE INVENTION

The present invention relates generally to turbine power generating systems including modular, distributed microturbine power generating units, which are operated at or near maximum turbine inlet temperature regardless of the load demand. More specifically, the present invention relates to a method and apparatus to permit increases in the load on the system without increasing the turbine inlet temperature, and decreases in the load on the system without decreasing turbine inlet temperature.

The United States Electric Power Research Institute (EPRI) which is the uniform research facility for domestic electric utilities, predicts that up to 40% of all new generation could be provided by distributed generators by the year 2006. In many parts of the world, the lack of electric infrastructure (transmission and distribution lines) will greatly expedite the commercialization of distributed generation technologies since central plants not only cost more per kilowatt, but also must have expensive infrastructure installed to deliver the product to the consumer.

Small, multi-fuel, modular distributed microturbine generation units could help alleviate current afternoon "brown-outs" and "blackouts" prevalent in many parts of the world. A simple, single shaft microturbine allows for low technical skill maintenance and low overall cost, which would allow for widespread purchase in those parts of the world where capital is sparse. In addition, given the United States emphasis on electric deregulation and the world trend in this direction, consumers of electricity would have not only the right to choose the correct method of electric service, but also a new cost effective choice from which to choose. U.S. Pat. No. 4,754,607 to McKay, which is assigned to the assignee of the present invention, discloses a microturbine power generating system suitable for distributed generation and cogeneration applications.

To make these turbine power generating systems more commercially attractive to consumers, improvements are needed in areas such as increasing fuel-efficiency, reducing size and weight, lowering thermal signature, noise, maintenance, and to maximize lifecycle costs. For example, it is difficult to achieve a good fuel economy and acceptable emission rates, especially for turbines having fixed geometry inlets. The highest efficiency of a power generation unit is achieved through high-pressure ratios and high turbine inlet temperatures. Conventionally, maximum temperatures result only during full loading. However, at part-load conditions and idling, fixed geometry gas turbine units are typically run at reduced turbine inlet temperatures, thereby reducing their fuel efficiency.

It is an object of the present invention to run the turbine of a power generating system at or very near the maximum design temperature of the turbine inlet (regardless of whether the generator is running at full load, partial load, or idling) to maintain maximum efficiency.

It is an object of the present invention, in a turbine generating system, to increase the turbine speed and, hence, the power output, without increasing the temperature of the turbine inlet.

It is a further object of the invention, in a turbine generating system, to decrease the turbine speed and, hence, the power output, without decreasing the temperature at the turbine inlet.

Another object of the present invention is to utilize catalytic combustion in conjunction with a turbine, including a recuperated microturbine, which requires maintaining the temperature of the turbine inlet in a high, narrow temperature range, regardless of turbine speed.

SUMMARY OF INVENTION

The present invention maximizes thermodynamic efficiency of a microturbine power generating system by maintaining the turbine inlet temperature in a narrow band range, at or near the maximum design temperature of the turbine inlet. The present invention includes: a turbine power generating system including a turbine having a fixed inlet nozzle geometry; an energy storage device; and a controller for maintaining the turbine inlet at or near maximum turbine inlet temperature. The controller causes the energy storage device to deliver at least a portion of the load, when a load increase is demanded of the system, for a short period of time while the turbine is accelerated to a new higher speed. When a load decrease is required, the controller causes the energy storage device to temporarily absorb a load from the generator.

DESCRIPTION OF THE PREFERRED EMBODIMENT

Figure 1:
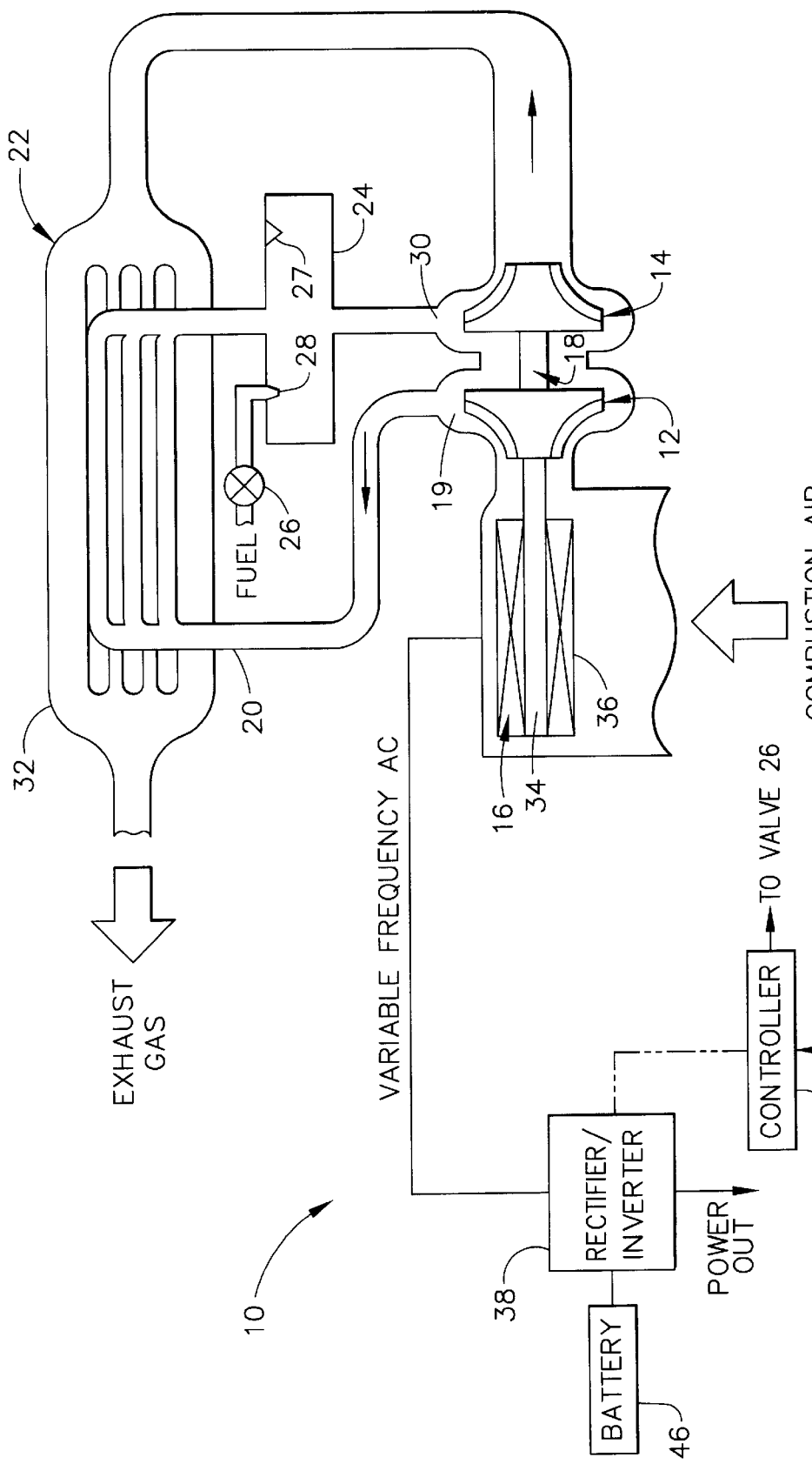
FIG. 1 is an illustration of a power generating system according to the present invention.

Referring to FIG. 1, a power generating system 10 according to the present invention is illustrated. The power generating system 10 includes a compressor 12, a turbine 14 and an electrical generator 16. The electrical generator 16 is cantilevered from the compressor 12. The compressor 12, the turbine 14 and the electrical generator 16 can be rotated on a single shaft 18. Although the compressor 12, turbine 14 and electrical generator 16 can be mounted to separate shafts, the use of a single common shaft 18 for rotating the compressor 12, the turbine 14 and the electrical generator 16 adds to the compactness and reliability of the power generating system 10.

In operation, air entering the inlet of the compressor 12 is compressed. Compressed air leaving outlet 19 of the compressor 12 is circulated through cold side passages 20 of recuperator 22. In the recuperator 22, the compressed air absorbs heat, which enhances combustion. The heated, compressed air leaving the cold side of the recuperator 22 is supplied to combustor 24.

Fuel is also supplied to the combustor 24. Both gaseous and liquid fuels can be used. Any suitable gaseous fuel can be used. Choices of fuel include diesel, flair gas, off gas, gasoline, naphtha, propane, JP-8, methane, natural gas and other man-made gases.

The flow of fuel is controlled by a flow control valve 26. The fuel is injected into the combustor 24 by an injection nozzle 28.

Inside the combustor 24 the fuel and compressed air are mixed and ignited by an igniter 27 in an exothermic reaction. In the preferred embodiment, the combustor 24 contains a suitable catalyst capable of combusting the compressed, high temperature, fuel-air mixture at the process conditions. Some known catalysts usable in the combustor 24 include platinum, palladium, as well as metal oxide catalysts with active nickel and cobalt elements.

After combustion, hot, expanding gases resulting from the combustion are directed to inlet nozzle 30 of the turbine 14. The inlet nozzle 30 has a fixed geometry. The hot, expanding gases resulting from the combustion is expanded through the turbine 14, thereby creating turbine power. The turbine power, in turn, drives the compressor 12 and the electrical generator 16.

Turbine exhaust gas is circulated by hot side passages 32 in a hot side of the recuperator 22. Inside the recuperator 22, heat from the turbine exhaust gas on the hot side is transferred to the compressed air on the cold side. In this manner, some heat of combustion is recuperated and used to raise the temperature of the compressed air en route to the combustor 24. After surrendering part of its heat, the gas exits the recuperator 22. Additional heat recovery stages could be added onto the power generating system 10.

The generator 16 can be a ring-wound, two-pole toothless (TPTL) brushless permanent magnet electric machine having a permanent magnet rotor 34 and stator windings 36. The turbine power generated by the rotating turbine 14 is used to rotate the rotor 34, which is attached to the shaft 18. When the rotor 34 is rotated by the turbine power, an alternating current is induced in the stator windings 36. Variations in the turbine speed will produce corresponding variations in the frequency (i.e., wild frequencies) of the alternating current generated by the electrical generator 16.

Regardless of the frequency of the ac power generated by the electrical generator 16, the ac power can be rectified to dc power and then inverted to produce ac power having a desired fixed frequency by rectifier/inverter 38. Accordingly, when more or less power is required of system 10, the turbine speed can be increased or reduced without affecting the frequency of the ac output.

Further, use of the rectifier/inverter 38 allows for wide flexibility in determining the electric utility service to be provided by the power generating system of the present invention. Because any inverter can be selected, frequency of the ac power can be selected by the consumer. If there is a direct use for ac power at wild frequencies, the rectifier/inverter 38 can be eliminated.

During operation of the power generating system 10, heat is generated in the electrical generator 16 due to inefficiencies in generator design. In order to extend the life of the electrical generator 16, as well as to capture useful heat, compressor inlet air flows over the generator 16 and absorbs excess heat from the generator 16. The rectifier/inverter 38 can also be placed in the air stream. After the air has absorbed heat from the aforementioned sources, it is compressed in the compressor 12 and further preheated in the recuperator 22.

System 10 includes a controller 42 which, inter alia, controls the turbine speed by controlling the amount of fuel flowing to the combustor 24 via flow control valve 26. The controller 42 uses sensor signals generated by a sensor group 44 to determine the external demands upon the power generating system 10. The sensor group 44 includes, at a minimum, sensors for measuring the turbine inlet temperature and the speed of shaft 18. Sensor group 44 also could include position sensors, various other temperature sensors, and pressure sensors, for measuring operating temperatures and pressures in the system 10. Using the aforementioned sensors, the controller 42 controls both startup and optimal performance during steady state operation. The controller 42 includes means (e.g. electronics) which uses the speed and temperature signals from the sensor group 44 to calculate the load demanded of the system 10.

When the rectifier/inverter 38 extracts electrical power from the generator, a load is placed on the generator and, thus, on the turbine. Reducing the turbine speed in response to a decreased load demand reduces the airflow because the compressor runs slower. Thus, in theory, the turbine inlet temperature remains essentially constant, to maintain a high efficiency at part load. However, in practice in prior art turbine generators, one had to reduce the turbine inlet temperature. Thus, to vary power, one typically had to vary turbine inlet temperature.

Typically, to increase power requires an increase in turbine speed, or turbine inlet temperature. However, where the turbine is designed to run at a substantially, constant high temperature and, thus, high efficiency, such as turbine 14 of system 10, an increase in temperature is undesirable as it will likely exceed the maximum design temperature of the system. Also, as catalytic combustors, such as combustor 24, operate only in a narrow temperature range, any increase in temperature above this range will render such catalytic combustor inoperable.

We have determined that by providing for a temporary source of energy, such as a battery, the power demand on the generator (and the turbine) can be temporarily reduced. This, in turn, allows the turbine speed to accelerate from a given rpm to a new, higher rpm, while maintaining the turbine inlet temperature constant. Once the turbine is running at the new higher speed, the generator will generate the additional power demanded, without an increase in the turbine inlet temperature. The load is then switched back to the generator 16. The period of time the load, or at least a portion of the load, is switched from generator 16 to battery 46 is short, typically in the range of 10–60 seconds depending on the amount of power increase and the inertia of the system. Specifically, to generate more power by increasing the speed of turbine 14, but without increasing the turbine inlet temperature, the power generating system 10 is provided with a battery 46 to provide, inter alia, temporary back-up power. Though all of the load is typically not shifted, the battery 46 is sized to handle the peak load demand on system 10.

While satisfying a demand for a constant power, the controller 42 includes means (e.g. electronics) which cause the generator 16 to deliver all of the entire system load demand. When the load demand is increased, the controller 42 includes means (e.g. electronics) which cause the rectifier/inverter 38 to deliver some or all of the load demand from battery 46, but only for the short time necessary for turbine 14 to accelerate to the new required higher speed (which is proportional to the new, higher load). While the battery 46 is supplying some or all of the load, the load on generator 16 is reduced, thereby causing the rotor speed to increase to a new higher level determined by the new load demand. Once this higher rotor speed is attained, the controller 42 causes the rectifier/inverter 38 to deliver the entire load from generator 16. Shifting load to the battery 46 allows the turbine inlet 30 to be maintained substantially consistent, at or near maximum temperature, which allows the system 10 to operate at maximum efficiency and to reduce the rate of emissions.

The use of battery 46 also permits the powerout to be reduced, while maintaining the turbine inlet temperature substantially constant. For this purpose, controller 42 also includes means (e.g. electronics) which, in response to a decrease in demand, causes the load on the generator to be temporarily increased and shifted to battery 46. So long as the turbine inlet temperature is maintained substantially constant, the increased demand has the effect of decelerating generator 16 and turbine 24. Once the turbine is decelerated the required amount (depending on the amount of the decrease and the inertia of the system), the controller 42 causes the entire reduced load to be delivered by the generator 16.

While battery 46 is illustrated in the preferred embodiment, other temporary sources to supply or absorb power, depending on whether there is an increase or decrease in the power demand, can be utilized. Alternatives include the power grid, capacitors, and a flywheel. When there is a decreased demand for power, the grid acts as an infinite sink.

Additionally, the controller 42 includes means (e.g. electronics) which control the turbine load independently of the electrical load demand on the system 10 by regulating the load on the generator 16. Due to variations in manufacturing, such as dimensional tolerances or changes in ambient conditions, the speed may need to be adjusted precisely to produce the demanded power. If turbine speed drops below a set point (the speed set point depending on the value of the system load demand), the controller 42 commands the rectifier/inverter 38 to reduce the load on the generator 16. If the turbine speed increases above the speed set point, the controller 42 commands the rectifier/inverter 38 to increase the load on the generator 16. The controller 42 includes means (e.g. electronics) which slowly adjust the speed setpoint up or down to the exact speed required to produce precisely the demanded power and, thus, shift the entire load to the turbine 14.

Sensor group 44 also includes a sensor which provides controller 42 with the state of direct current storage in battery 46. Controller 42, via rectifier/inverter 38, controls the condition of net charge and net drain on the battery 46. Battery 46 can also be sized to provide, in the event of generator failure, via rectifier/inverter 38, uninterrupted power for hours.

A switch/starter control (not shown) can be provided off-skid to start the power generating system 10. Rotation of the compressor 12 can be started by using the generator 16 as a motor. During startup, the switch/starter control supplies an excitation current to the stator windings 34 of the electrical generator 16. Startup power is supplied by the battery 46. In the alternative, the grid or a compressed air device could be used to motor the power generating system 10.

Figure 2:
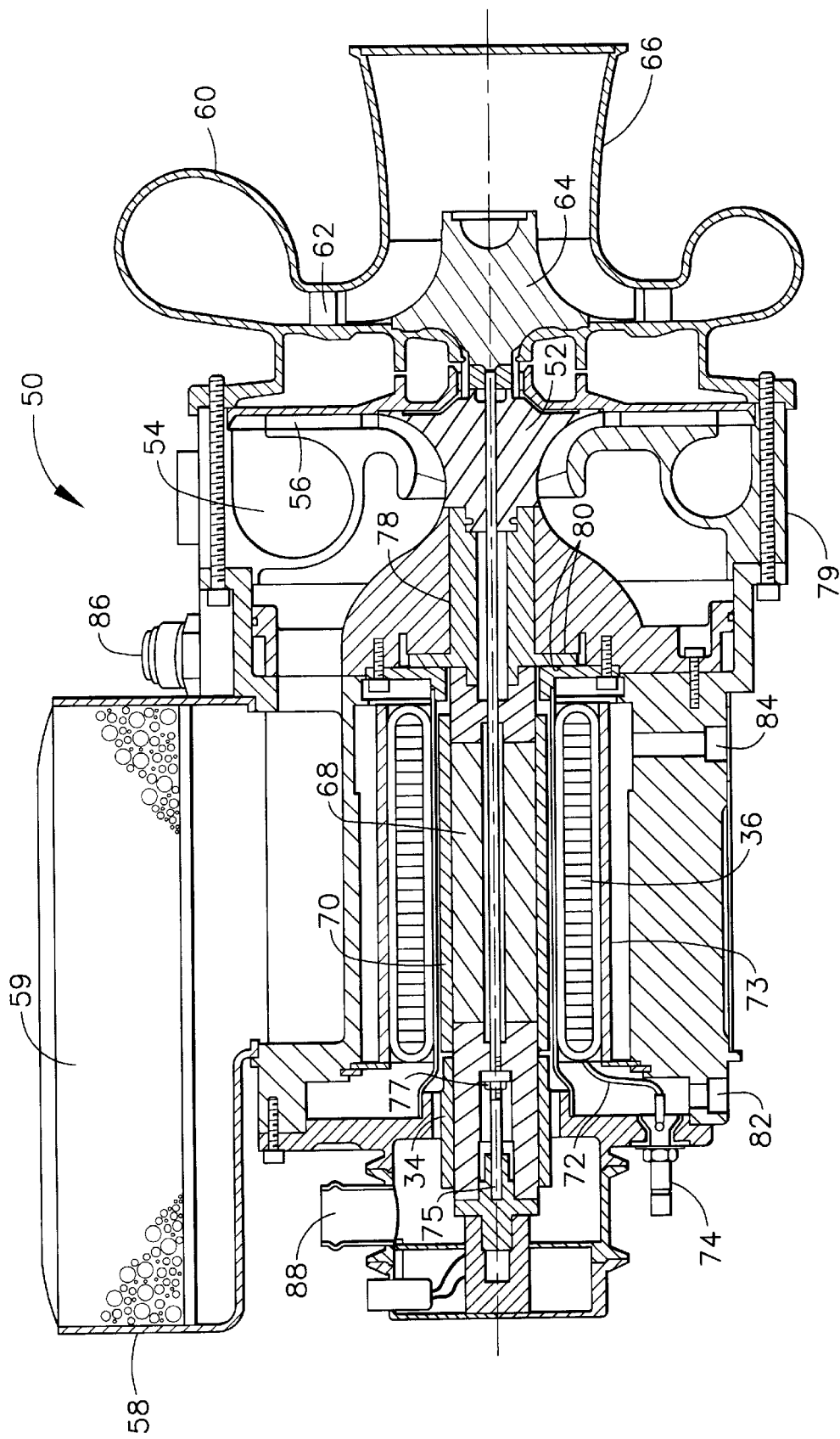
FIG. 2 is an illustration of an engine core for the power generating system.

Referring to FIG. 2, the "engine core" 50 of the power generating system 10 is shown. The compressor 12 includes an impeller 52 having a bore, a compressor scroll 54 and a diffuser channel 56. Air entering an air inlet 58 is filtered by an air filter 59 and directed to the compressor scroll 54. Air flowing out of the compressor scroll 54 is directed to the recuperator 22.

The turbine 14 includes a turbine scroll 60, a plurality of fixed nozzle vanes 62, and a boreless turbine wheel 64. Hot expanding gases leaving the combustor 24 are directed into the turbine scroll 60 and through the nozzle vanes 62, which redirect the hot expanding gas onto the turbine wheel 64. Turbine exhaust gas leaves turbine 14 through an exhaust diffuser 66, which reduces the temperature and noise of the turbine exhaust gas.

The rotor 34 of the electrical generator 16 includes magnets 68 made of a rare earth material such as samarium cobalt. The magnets 68 are surrounded by a containment sleeve 70 made of a non-magnetic material such as Inconel 718. The stator windings 36 are housed in a generator housing 73. The rotor 34 has a bore and an optional containment sleeve (not shown) contacting a surface of the bore. Power conductors 72 extend from the stator windings 36 and terminate in a power connector stud 74, which is secured to a base 73 (not shown). The base provides support for a fuel inlet, the air inlet 58, the compressor 12, the turbine 14, the generator 16, the recuperator 22, the combustor 24, and the rectifier/inverter 38, to enable the system 10 to exist as a packaged unit.

The single shaft 18 is shown in FIG. 2 as a tieshaft 75, which extends through the bores in the rotor 34 and the compressor impeller 52. The tieshaft 75 is thin, having a diameter of approximately 0.25 inches to 0.5 inches. The bores have clearances that allow the tieshaft 75 to extend through the rotor 34 and the impeller 52. However, the tieshaft 75 does not extend through the turbine wheel 64. Instead, the tieshaft 75 is secured to the turbine wheel 64. The tieshaft 75 can be secured to the center of the turbine wheel hub by an inertia weld. Thus, the turbine wheel 64 is boreless in that it does not have a bore through which the tieshaft 75 extends. Eliminating the bore reduces stresses in the turbine wheel 64.

When clamped together by the tieshaft 75, the compressor impeller 52, the turbine wheel 64 and the rotor 34 are rotated as a single unit. Under high operating temperatures and rotational speeds, however, the impeller 52, the turbine wheel 64 and the rotor 34 tend to expand and grow apart and their faces tend to lose contact. Flexing of the tieshaft 75 during operation also tends to separate the faces. To maintain contact between the faces of the impeller 52, the turbine wheel 64 and the rotor 34 at high rotational speeds (65,000 rpm and above), the tieshaft 75 is preloaded. For example a tieshaft 75 made of Inconel 718 can be preloaded in tension to about 90% of yield strength. During assembly, the tieshaft 75 is preloaded, the impeller 52 and the rotor 34 are slid over the tieshaft 75, and a nut 77 is secured to a threaded end of the tieshaft 75. The tension in the tieshaft 75 is maintained as the nut 77 is turned.

The rotating unit 52, 64, 34 and 75 is supported in a radial direction by inboard and outboard foil journal bearings 76 and 78. The rotating unit 52, 64, 34 and 75 is supported in an axial direction by a foil thrust bearing 80. The foil bearings eliminate the need for a separate bearing lubrication system and reduce the occurrence of maintenance servicing.

Various coolant ports are provided for the engine core 50. Provided are ports 82 and 84 for circulating a coolant over the stator windings 40. Also provided are ports 86 and 88 for circulating a coolant over the bearings 76, 78 and 80.

The power generating system 10 can be built in several major modules such as a rotating module, a heat exchanger module, a combustor module, and an electronics module. Each of these modules is relatively lightweight and compact. The modules can be replaced without breaking liquid lines. The use of foil bearings 76 and 78 eliminates the need for an oil-based lubrication system and, therefore, results in low maintenance of the power generating system 10. Scheduled maintenance would consist primarily of replacing the igniter 27, the filter 59 and catalyst elements in the combustor 24.

The power generating system 10 operates on a conventional recuperated Brayton cycle. The Brayton cycle can be operated on a relatively low pressure ratio (e.g. 3.8) to maximize overall efficiency since, in recuperated cycles, the lower the pressure ratio, the closer the turbine exhaust temperature is to the inlet temperature. This allows heat addition to the cycle at high temperature and, in accordance with the law of Carnot, reduces the entropic losses associated with supplying heat to the cycle. The high temperature heat addition results in an increased overall cycle efficiency.

The values that follow are provided by way of an example. Air is compressed in a single stage radial compressor to 3.8 bars. The compressed air is directed to the recuperator 22 where the temperature of the compressed air is increased using the waste heat from the turbine exhaust gas. The temperature of the exhaust gas from the turbine 14 is limited to about 1,300° F. in order to help extend the life of the recuperator 22. For exhaust gas temperatures above 1,300° F., the recuperator 22 can be made of super alloys instead of stainless steel. The recuperator 22 can be designed for either 85% or 90% effectiveness depending on the economic needs of the customer. In the most efficient configuration, and using the 90% recuperation, the overall net cycle efficiency is 30%, yielding a high heating value heat rate of approximately 11,900 BTU/kWh on diesel.

After being heated in the recuperator 22, the compressed air is directed to the combustor 24, where additional heat is added to raise the temperature of the compressed air to 1,650° F. A combustor 24 designed according to a conventional design can yield a NOx level of less than 25 ppm, and a combustor 24 using a catalyst can yield a NOx rate that is virtually undetectable (commercial NOx sensors are limited to a 2 to 3 ppm detection range). The high enthalpic gas is then expanded through the turbine 14. The impeller 52, the turbine wheel 64, the rotor 34, and the tieshaft 75—the only moving parts in the engine core 50—spin as a single unit at high speeds of approximately 65,000 rpm or more. The resulting generator output frequency of around 1,200 hertz is then reduced by the inverter 38 to a grid-compatible 50 or 60 hertz. Resulting is a high power density typified by low weight (about a third of the size of a comparable diesel generator) and a small footprint (for example, approximately 3 feet wide by 5 feet long by 6 feet high).

The high power density and low weight of the system 10 is made possible through the high speed components which permit large amounts of power using a minimum of material. The unit is completely self-contained in a weather proof enclosure (not shown). The power generating system 10 is "plug and play", requiring little more than a supply of clean fuel, liquid or gas.

Thus disclosed is a highly efficient power generating system 10. Even though the turbine 14 is inherently unstable, it operates within a stable system 10. The turbine 14 can be operated at or near maximum inlet temperature, yet it will not stall or overheat if an increase in demand is met. Because the turbine 14 is operated at or near maximum inlet temperature, thermodynamic efficiency of the system 10 is maximized and emissions are reduced.

The microturbine power generating system 10 can use multiple fuels including natural gas, diesel and JP-8. The power generating system 10 has a low thermal signature and minimal noise generation. The use of air bearings eliminates the need for an oil-based lubrication system. The electrical generation system 10 has high reliability and minimal service requirements due to single moving part design. The use of an electronic rectifier/inverter 38 allows the system 10 to provide a variable ac output. Installation is easy due to a modular and self contained design, and servicing is easy because the engine core 50 has one moving part and major parts that are easily accessible. The width, length and height of the engine core 50 can be adjusted to fit a wide variety of dimensional requirements.

The power generating system 10 is smaller, lighter, more fuel-efficient and has lower thermal signature, noise, maintenance and cost penalties than comparable internal combustion engines. Therefore, due to its low installation costs, high efficiency, high reliability and simple, low cost maintenance, the power generating system 10 provides lower operating and fixed costs than power generators of comparable size.

Potential applications for the power generating system 10 are many and diverse. Applications include use in off-grid applications for standalone power, on-grid applications for peak shaving, load following or base load service, emergency back-up and uninterruptible power supply, prime mover applications (e.g., pump, air conditioning) and automotive hybrid vehicles.

The invention is not limited to the specific embodiments disclosed above. For example, as stated above, a flywheel, capacitors or the grid can be used as a storage device instead of the battery 46. With a flywheel, when peak power is demanded, the momentum of the flywheel allows additional power to be delivered and an additional load to be placed on the electrical generator 16, all without stalling the turbine 16. The invention also can be used in turbine driven hybrid electric vehicles. Accordingly, the present invention is construed according to the claims that follow.

What is claimed is:

1. A method of controlling the turbine of a turbine powered generating system regardless of the load on said system, to maximize the efficiency of said turbine, said turbine having a fixed inlet nozzle geometry, said system further including an electrical generator, and a storage device, said method comprising:

(a) maintaining said inlet nozzle at a substantially constant temperature;

(b) using said electrical generator to satisfy the power demand on said system until said system is required to satisfy an additional power demand;

(c) when said additional power is demanded, temporarily using said storage device to satisfy said additional power demand and at least a portion of said power demand;

(d) increasing the speed of said turbine from the speed required to satisfy said power demand to a higher speed required to satisfy said power demand and said additional power demand; and (e) once said higher speed is achieved, using said electrical generator to satisfy both said power demand and said additional power demand.

2. The method as set forth in claim 1, wherein said substantially constant temperature is at or near the maximum design temperature of said turbine.

3. The method of claim 1, wherein said external storage device is used to temporarily satisfy all of said additional power demand and said power demand.

4. A method of controlling the turbine of a turbine powered generating system regardless of the load on said system, to maximize the efficiency of said turbine, said turbine having a fixed inlet nozzle geometry, said system further including an electrical generator, and a storage device, said method comprising:

(a) maintaining said inlet nozzle at a substantially constant temperature;

(b) using said electrical generator to satisfy the power demand on said system until said system is required to satisfy a lower power demand;

(c) when said lower power is demanded, temporarily increasing the power demand on said generator and temporarily using said storage device to absorb said additional power demand and at least a portion of said power demand;

(d) decreasing the speed of said turbine from the speed required to satisfy said power demand to a lower speed required to satisfy said lower power demand; and (e) once said lower speed is achieved, using said electrical generator to satisfy said lower power demand.

5. A method as set forth in claim 4, wherein said constant temperature is at or near the maximum design temperature of said turbine.

6. A turbine powered generating system comprising:

(a) a turbine having a fixed inlet nozzle and a predetermined maximum inlet temperature;

(b) a generator coupled to said turbine, said generator capable of supplying the power demand on said system;

(c) an energy storage device, said storage device also capable of supplying said power demand on said system; and (d) a controller, coupled to both said storage device and said turbine, for maintaining said inlet nozzle at or near said maximum inlet temperature, said controller, in response to an additional power demand on said system, causing said energy storage device to satisfy said additional power demand and at least a portion of said power demand, to allow the speed of said turbine to increase to a higher speed at which said generator can satisfy said additional power demand and said power demand.

7. The generating system of claim 6, wherein said controller causes said additional power demand and said power demand to be shifted to said generator when said turbine reaches said higher speed.

8. The generating system of claim 6, wherein said controller, in response to said additional power demand, causes said energy storage device to temporarily supply all of said power demand.

9. The generating system of claim 6, wherein said storage device is selected from the group including a battery, a flywheel, a capacitor or a power grid.

10. The generating system of claim 9, wherein said storage device is a battery and said battery is sized to supply the maximum power demand on said system.

11. The generating system of claim 6, wherein said turbine is a microturbine.

12. The generating system of claim 11, wherein said microturbine is a recuperated microturbine.

13. The generating system of claim 6, wherein said controller includes means, in response to a lower power demand on said system, for causing said power demand on said generator to be temporarily increased and temporarily absorbed by said energy storage device.

14. The generating system of claim 13, wherein said controller shifts said lower power demanded to said generator when said turbine has decelerated to the speed required to satisfy said lower power demanded.

15. A turbine powered generating system comprising:

(a) a turbine having a fixed inlet nozzle and a predetermined maximum inlet temperature;

(b) a generator coupled to said turbine, said generator capable of supplying the power demand on said system;

(c) an energy storage device, said storage device also capable of temporarily absorbing at least a portion of said power demand on said system; and (d) a controller, coupled to both said storage device and said turbine, for maintaining said inlet nozzle at or near said maximum inlet temperature, said controller including means, in response to a decreased power demand on said system, for temporarily causing an additional power demand on said generator and for causing said additional power demand and at least a portion of said power demand to be shifted to said energy storage device to allow the speed of said turbine to decrease to a lower speed, where said generator can supply said decreased power demand.

16. Apparatus for controlling a turbine power generation system, said system including a turbine having a fixed inlet nozzle, said system being responsive to a load demand during operation, the apparatus comprising:

(a) an electric generator;

(b) an energy storage device;

(c) a controller including means for monitoring the speed of said turbine and the temperature of said inlet nozzle, said controller further including means for determining whether to shift any of said load demand from said generator to said energy storage device when said load demand changes; and (d) means, responsive to said controller, for regulating fuel flow to said turbine to hold said temperature of said inlet nozzle substantially constant, even when said load demand changes.

17. The apparatus of claim 16, wherein said controller causes said regulating means to hold said temperature of said inlet nozzle substantially constant, independent of turbine speed.

18. The apparatus of claim 16, wherein turbine speed is controlled by regulating a load on said generator in order to maintain a speed set point.

19. The apparatus of claim 18, wherein said turbine speed set point is determined by said load demand and achieved by controlling said generator load independent of said load demand.

20. The apparatus of claim 18, wherein said controller causes said generator load to increase when said turbine speed increases above said speed set point.

* * * * *